US006494228B2

(12) United States Patent
Guillaume et al.

(10) Patent No.: US 6,494,228 B2
(45) Date of Patent: Dec. 17, 2002

(54) PLANT FOR TRANSFERRING A GAS INTO A LIQUID

(75) Inventors: Philippe Guillaume, Sucy en Brie (FR); José Buil, Fresnes (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/832,024

(22) Filed: Apr. 11, 2001

(65) Prior Publication Data

US 2001/0027809 A1 Oct. 11, 2001

(30) Foreign Application Priority Data

Apr. 11, 2000 (FR) .......................................... 00 04621

(51) Int. Cl.[7] ............................................... G05D 16/20

(52) U.S. Cl. ................................. 137/209; 261/DIG. 7

(58) Field of Search .................... 137/209; 261/DIG. 7

(56) References Cited

U.S. PATENT DOCUMENTS 4,187,262 A * 2/1980 Fessler et al. ......... 261/DIG. 7

* cited by examiner

*Primary Examiner*—Gerald A. Michalsky
(74) *Attorney, Agent, or Firm*—Burns, Doane, Swecker & Mathis, L.L.P.

(57) ABSTRACT

A plant for transferring a gas in the gaseous or liquified state into a liquid. The plant includes a pressurized-gas circuit (2) having a device (21, 22) for injecting gas in the gaseous or liquid state into a liquid, a chamber (13) for mixing the gas with the liquid, the chamber located downstream of the gas injection device and having an outlet connected to the overhead of a buffer tank (14) in order to introduce, into the latter, liquid, in the form of droplets or streams, with which the gas is mixed, and a mechanism (15) for withdrawing the liquid/gas mixture from the tank. The plant may be used for the carbonation of consumable liquids.

28 Claims, 2 Drawing Sheets

PLANT FOR TRANSFERRING A GAS INTO A LIQUID

BACKGROUND OF THE INVENTION

1. Field of the Invention

The invention relates to a plant for transferring a gas into a liquid, especially for transferring, into such a liquid, carbon dioxide (for carbonation), oxygen (for oxygenation), ozone (for ozonation) or nitrogen, for example for the purpose of displacing a gas already dissolved in the liquid. The term "gas" is understood to mean a fluid which is in the gaseous state under normal temperature and pressure conditions but which, under the operating conditions, may either be in the gaseous state or in the liquid state when it is introduced into the liquid proper.

2. Description of the Related Art

In general, a mass of liquid, which initially contains no gas or contains little gas and the free surface of which is in contact with a volume of gas, receives a transfer of a portion of the gas into the liquid and the combination tends towards a liquid-gas distribution in stable equilibrium. It may be demonstrated that the mass M of gas that can be transferred into a certain volume of liquid is proportional to the difference D between the saturation concentration and the actual concentration, to the area A of the liquid-gas interface, to the time t and to a surface transfer coefficient f. It will be noted that the difference D varies over time, becoming zero.

If, for the purpose of reducing the duration of the transfer operation, it is desired to increase the area of the interface A between the liquid and the gas, all other things remaining equal, this results in relatively large transfer plants.

SUMMARY OF THE INVENTION

The object of the invention is to remedy this drawback and, for this purpose, relates to a plant for transferring a gas in the gaseous state or in the liquid state into a liquid, characterized in that it comprises a liquid circuit in at least part of which the liquid flows under pressure, a gas circuit in at least part of which the gas under pressure flows and which includes, at the outlet, a device for injecting gas in the gaseous state or in the liquid state under pressure and emerging in that part of the liquid circuit in which the liquid flows under pressure, the liquid circuit including a chamber for mixing the gas with the liquid, the said chamber being located downstream of the gas injection device and having an outlet connected to the overhead of a buffer tank located downstream of the mixing chamber, in order to introduce into the buffer tank, in the form of liquid droplets or streams, liquid with which gas is mixed, and means for withdrawing, from the buffer tank, liquid with which gas is mixed.

By virtue of these characteristics, the plant is very efficient and allows rapid transfer without occupying a large space; in addition, it allows the amount of gas dissolved in the liquid to be very accurately adjusted.

The plant may furthermore have one or more of the following characteristics:

- it includes means for adjusting the pressure of the overhead of the buffer tank;
- it includes means for adjusting the pressure of the overhead of the buffer tank according to the temperature of the liquid;
- the adjustment means comprise means for measuring the said pressure and for comparing it with a set pressure, means for discharging gas from the buffer tank if the measured pressure is above the set pressure and means for admitting gas into the buffer tank if the measured pressure is below the set pressure;
- the said admission of gas is done into the overhead of the buffer tank;
- the gas is carbon dioxide, for example carbon dioxide filtered and sterilized for food applications;
- the gas is nitrogen, oxygen or ozone;
- the liquid is an aqueous liquid;
- the gas is introduced into the liquid circuit in the gaseous state and the injection device comprises an injection apparatus slaved to the transfer pump so that the gas flow is interrupted if the pump stops, this apparatus feeding an outlet injector which emerges in the liquid circuit;
- the gas is introduced into the liquid circuit while itself being in the liquid state, and the injection device comprises an expansion and control valve feeding an outlet injector which emerges in the liquid circuit;
- the mixing chamber is a device consisting of a succession of tubes forming a coil, such as a tube reactor;
- the mixing chamber is an in-line static mixer;
- the means for adjusting the pressure in the overhead of the tank have a set pressure which varies according to the temperature of the liquid;
- the means for adjusting the pressure in the overhead of the tank comprise an expansion valve, the inlet of which is connected to the gas circuit and the outlet of which is connected to the overhead of the tank.

Figure 1:
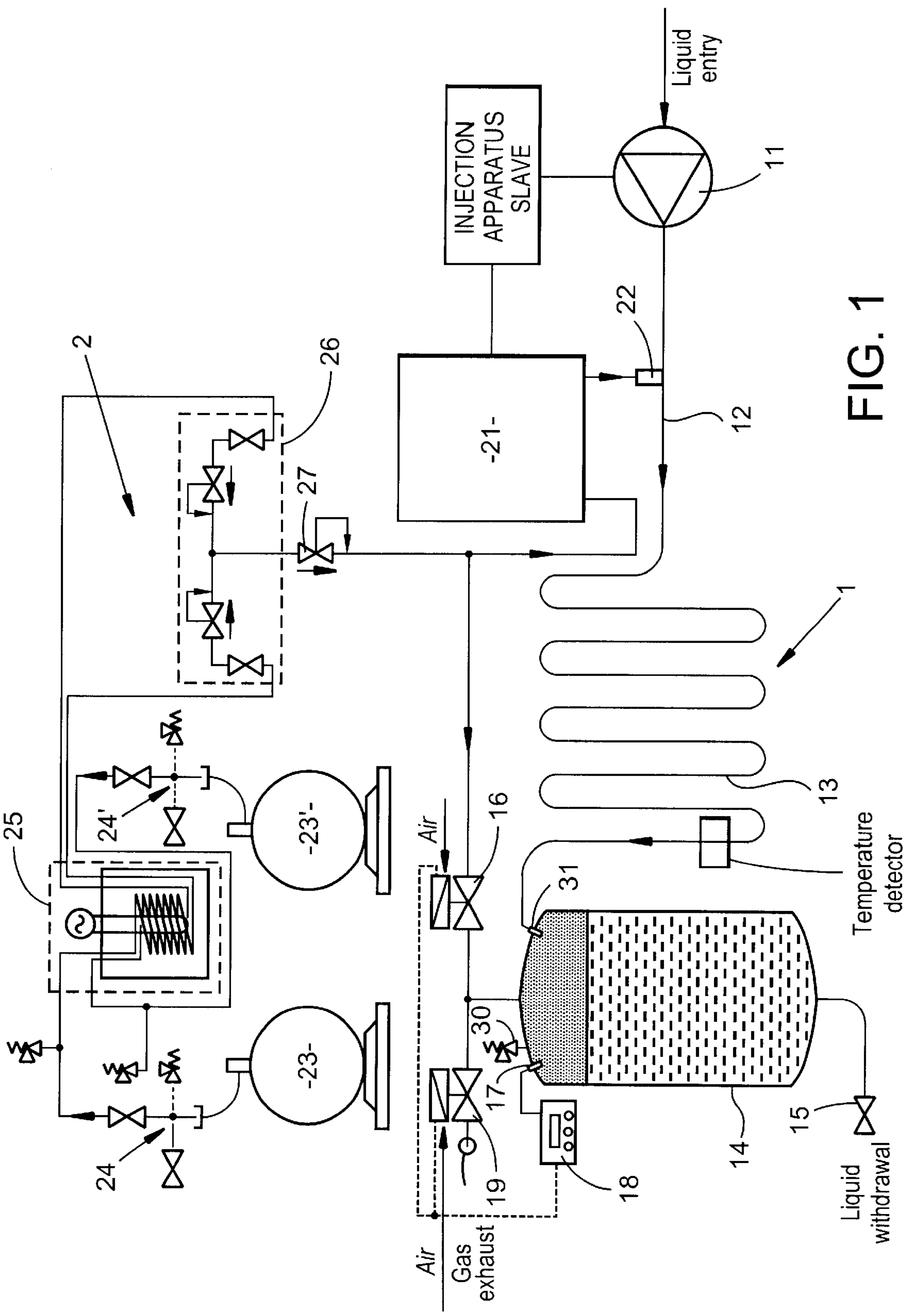
FIG. 1 is a diagram showing a plant for transferring a gas into a liquid in accordance with one embodiment of the invention.
Figure 2:
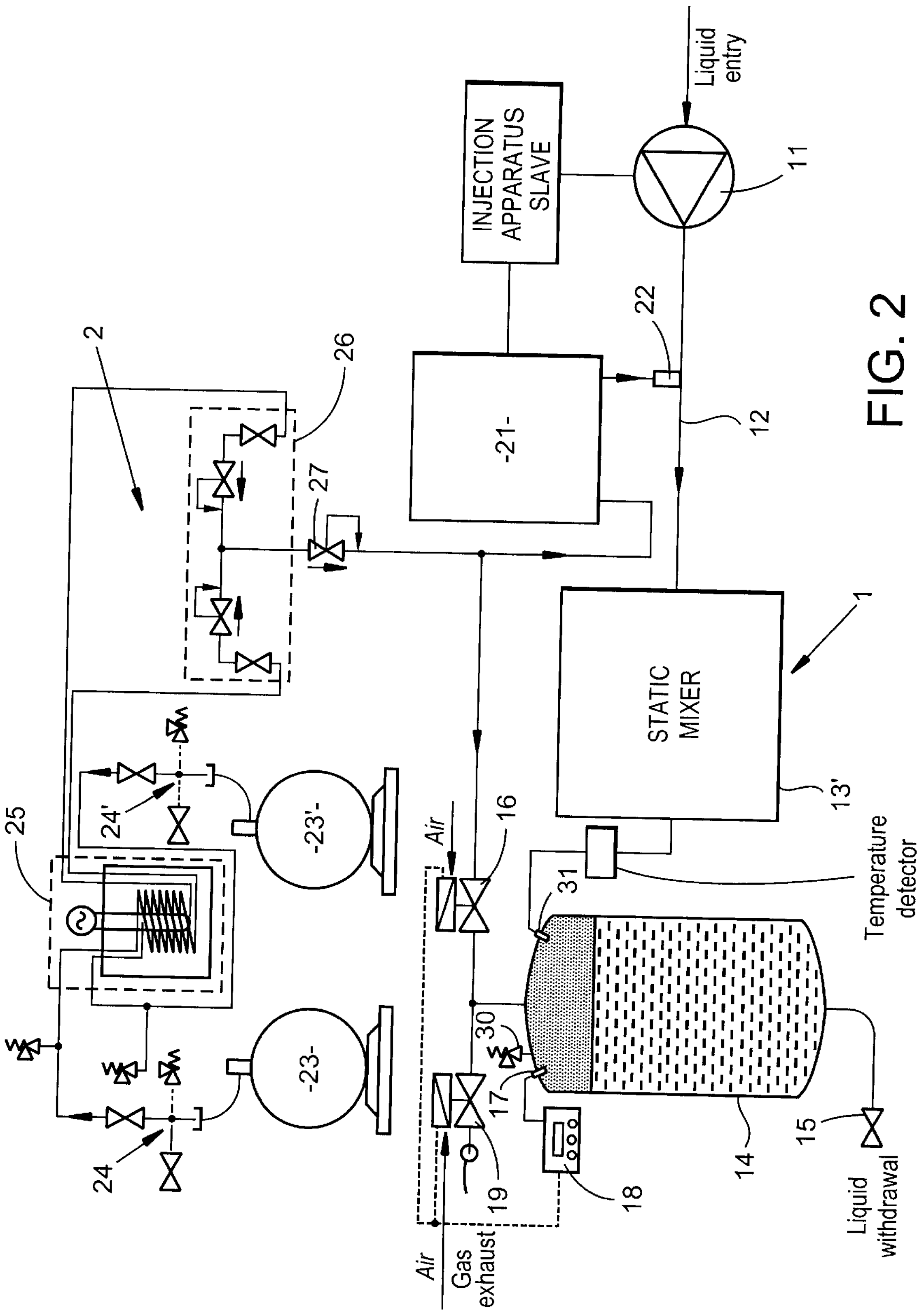
FIG. 2 is a diagram showing a plant for transferring a gas into a liquid in accordance with a second embodiment of the invention.

Further characteristics and advantages of the invention will emerge from the description which follows of one embodiment of this invention, given as a non-limiting example and illustrated by the appended diagram.

DETAILED DESCRIPTION OF THE PREFERRED EMBODIMENTS

The plant shown in this diagram is a plant for transferring carbon dioxide in the gaseous state or in the liquid state into an aqueous liquid, for example a consumable liquid intended to form a carbonated drink; in such an application in the food sector, the carbon dioxide has been filtered and sterilized beforehand, for example by the process of French Patent Application published under No. 2 774 006.

This plant comprises a liquid circuit 1 which includes, from the upstream end to the downstream end, a transfer pump 11, the inlet of which is fed with liquid to be carbonated, a line 12, the upstream end of which is connected to the outlet of the pump, a chamber 13 in the upstream end of which the downstream end of the line emerges and by means of which chamber the gas, in this case carbon dioxide, introduced into the line 12 or into the inlet of the mixing chamber is intimately mixed with the liquid, a buffer tank 14, at the upper part of which an overhead consisting of the same gas is maintained and to which the downstream end of the mixing chamber 13 is connected, and withdrawal means 15 for removing carbonated liquid from the buffer tank 14 at desired moments, according to the requirements. The liquid circuit 1 also includes a detector for detecting the level of the liquid in the tank, and at least one detector for detecting the temperature in the circuit, these detectors not being shown.

The line 12 is set and kept under load in such a way that the carbon dioxide is "forced" into the liquid and in such a way that no separate flow of liquid and no separate flow of carbon dioxide are observed in the line.

As will be described below, the pressure in the overhead of the buffer tank 14 is in this case adjusted, with respect to a set value, independently of the level of the liquid. This adjustment allows the variation in the concentration of the gas in the liquid to be accurately controlled.

The plant also comprises a pressurized-gas circuit 2, in this case the gas is in the gaseous state, having, at the outlet, a gas injection device comprising an injection apparatus 21 such as that sold under the name "Coffret d'Injection Carb'Eco" by the company "Carboxyque Francaise", which feeds an outlet injector 22 having a non-return valve and emerging, as was seen, downstream of the transfer pump 11, in the line 12 pressurized by this pump or, as a variant, in the inlet region of the mixing chamber 13. The injection apparatus 21 is slaved to the transfer pump 11, especially in such a way that the injection of gas is interrupted if the pump stops.

In the example shown, in which the gas (carbon dioxide) comes from a sphere of cryogenic bulk or liquefied gas, the upstream part of the gas circuit is duplicated so that when one sphere 23 is empty another sphere 23' can take over and thus allow the empty sphere to be replaced with a full sphere which is itself intended to take over from this other sphere when it in turn becomes empty.

Thus, the gas circuit comprises two spheres 23, 23' of liquefied (non-cryogenic) gas, the respective outlets of which are connected via a suitable control device 24, 24' to two respective inlets of a vaporizer 25 containing an electrical resistance element, the outlets of which are connected to two respective inlets of an apparatus 26 for depressurizing and switching, automatically, the spheres; this apparatus 26 comprises a single outlet able to be connected to one or other of its inlets in such a way that, when one of the spheres is empty, the connection between the corresponding inlet and the outlet is broken and a connection between the inlet corresponding to the other sphere and the outlet is made; the outlet of the apparatus 26 is connected to the inlet of the injection device via a downstream pressure regulator 27; the outlet of the downstream pressure regulator 27 is connected, on the one hand, directly to the inlet of the injection apparatus 21 and, on the other hand, via an expansion valve 16, to the overhead of the buffer tank 14 so as to introduce, into the latter, gas when the pressure therein is insufficient, and to do so whatever the level of the liquid in the buffer tank, detected by the level detector.

More precisely, here the pressure of the gas is kept constant in the overhead of the buffer tank 14 by means of a pressure-regulating device which includes a pressure sensor 17 placed in the overhead of the buffer tank, a PID pressure regulator 18 which receives a set pressure signal and a measured pressure signal delivered by the pressure sensor 17, and a discharge valve 19, the inlet of which is connected to the overhead of the buffer tank and the outlet of which opens to the atmosphere. This discharge valve 19 and the expansion valve 16 are controlled by the regulator 18, respectively in order to remove gas from the overhead when the pressure therein rises to a value above the set pressure and in order to introduce gas thereinto when the pressure drops to a value below this set pressure; in addition, the overhead of the buffer tank 14 is equipped with a safety valve 30 which vents gas into the atmosphere if, despite the regulation, the pressure in the overhead of the tank reaches a predetermined threshold value.

The mixing chamber 13 is a tube reactor consisting of a succession of parallel tubes, for example rising and falling tubes, forming a coil ensuring that the liquid and the gas that it contains have a long enough contact time to allow transfer of the gas into the liquid, while preventing, as was seen, any separation of the two phases; this chamber may, as a variant, be an in-line static mixer.

At the outlet of the mixing chamber 13, the gas-laden liquid is introduced via a nozzle 31 into the overhead of the tank, as a spray in the form of droplets or streams forming a film flowing downwards over the internal surface of the wall of the tank; thus a large area is obtained for exchange between the gas-laden liquid and the gas in the overhead of the tank, the pressure of which is regulated and the concentration of the gas in the liquid is kept approximately constant. More precisely, the pressure chosen as the set pressure in the overhead of the tank 14 is given by Henry's law:

$$P=H.x$$

in which:

P is the partial pressure of the gas;

H is the Henry coefficient for this gas; and x is the concentration of gas in the liquid to be obtained.

The set pressure may be chosen with an x value corresponding to a given temperature of the liquid, or better still may be chosen so as to correlate with the temperature of the liquid and, for example, to be slaved to this temperature, the reduction in the temperature making it easier for the gas to dissolve; in this case, in order to obtain a constant concentration, when the temperature of the liquid, indicated by a temperature detector placed at a suitably chosen point in the liquid circuit, varies, the value of the set pressure is made to vary in the same direction.

By way of indication, the relative pressure in the liquid circuit 1 at the outlet of the transfer pump 11 is of the order of a few tenths of a bar to a few bar, and the relative pressure in the gas circuit 2 between the injection apparatus 21 and the outlet injector 22 is a few bar, typically less than 10 bar, unless the gas is injected in liquid form. The gas comes from a sphere 23, 23' where it is stored in the liquid state under a pressure of a few tens of bar or, as a variant, from storage bottles in the bulk or gaseous state; at the outlet of the downstream pressure regulator 27, the gas pressure is of the order of ten bar, and it is approximately at this pressure, or at a lower pressure, that the gas is delivered to the injection device 21 and to the expansion valve 16 which, together with the discharge valve 19, adjusts the pressure in the overhead of the buffer tank 14 to a value here of, for example, about 2.5 to 3 bar.

If the gas initially stored in the liquid state is not intended to be introduced in the gaseous state into the so-called "gas" circuit, which is then greatly simplified compared to that of the example described above, and if it is then transferred in the liquid state into the liquid circuit, the injection apparatus may simply be an expansion and control valve; on the other hand, the device for regulating or slaving the pressure of the overhead of the tank must include suitable means for feeding the overhead with gas in the gaseous state.

Thus, in general, if the liquid injection is supersaturated with gas or if the volume of the overhead rapidly decreases on account of a stoppage in withdrawal, and thus the pressure in the overhead of the tank 14 exceeds the set value, the discharge valve 19 opens and allows the gas to escape until the pressure comes back down to the set value; on the other hand, if the liquid is deficient in gas or if the volume of the overhead increases rapidly as a result of imperfect withdrawal, it is the expansion valve 16 which opens, and some gas in the gaseous state is introduced until the pressure in the overhead has come back up to the set value.

Of course, the invention is not limited to the embodiments that have been shown and described above, and it will be possible to provide other embodiments thereof without departing from its scope, and especially embodiments intended to transfer into a liquid a gas other than carbon dioxide, especially oxygen, ozone or nitrogen.

What is claimed is:

1. Plant for transferring a gas in the gaseous or liquid state into a liquid, which comprises a liquid circuit in at least part of which the liquid flows under pressure, a gas circuit in at least part of which the gas under pressure flows and which includes, at an outlet, a gas injection device for injecting gas in the gaseous or liquid state under pressure and emerging in that part of the liquid circuit in which the liquid flows under pressure, the liquid circuit including a mixing chamber for mixing the gas with the liquid, the said chamber being located downstream of the gas injection device and having an outlet connected to an overhead of a buffer tank located downstream of the mixing chamber to introduce into the buffer tank, in the form of liquid droplets or streams, liquid with which the gas is mixed, means for withdrawing from the buffer tank, liquid with which gas is mixed, and means for adjusting the pressure of the overhead of the buffer tank including means for measuring the said pressure and comparing it with a set pressure, means for discharging gas from the buffer tank when the measured pressure is above the set pressure and means for admitting gas into the buffer tank when the measured pressure is below the set pressure.

2. Plant according to claim 1, which further includes means for adjusting the pressure of the overhead of the buffer tank according to the temperature of the liquid.

3. Plant according to claim 2, wherein the gas is carbon dioxide.

4. Plant according to claim 2, wherein the gas is nitrogen, oxygen or ozone.

5. Plant according to claim 2, wherein the said admission of gas is done into the overhead of the buffer tank.

6. Plant according to claim 2, wherein the liquid is an aqueous liquid.

7. Plant according to claim 2, wherein the gas is introduced into the liquid circuit in the gaseous state and the injection device comprises an injection apparatus slaved to a transfer pump so that the gas flow is interrupted if the pump stops, this apparatus feeding an outlet injector which emerges in the liquid circuit.

8. Plant according to claim 2, wherein the gas is introduced into the liquid circuit while in the liquid state, and the injection device comprises an expansion and control valve feeding an outlet injector which emerges in the liquid circuit.

9. Plant according to claim 2, characterized in that the mixing chamber is a device consisting of a succession of tubes forming a coil.

10. Plant according to claim 2, wherein the mixing chamber is an in-line static mixer.

11. Plant according to claim 2, wherein the means for adjusting the pressure in the overhead of the tank have a set pressure which varies according to the temperature of the liquid.

12. Plant according to claim 2, wherein the means for adjusting the pressure in the overhead of the tank further includes an expansion valve, the inlet of which is connected to the gas circuit and the outlet of which is connected to the overhead of the tank.

13. Plant according to claim 1, wherein the said admission of gas is into the overhead of the buffer tank.

14. Plant according to claim 13, wherein the gas is carbon dioxide.

15. Plant according to claim 13, wherein the gas is nitrogen, oxygen or ozone.

16. Plant according to claim 13, wherein the liquid is an aqueous liquid.

17. Plant according to claim 13, wherein the gas is introduced into the liquid circuit while in the liquid state, and the injection device comprises an expansion and control valve feeding an outlet injector which emerges in the liquid circuit.

18. Plant according to claim 13, wherein the mixing chamber is a device consisting of a succession of tubes forming a coil.

19. Plant according to claim 13, wherein the mixing chamber is an in-line static mixer.

20. Plant according to claim 1, wherein the gas is carbon dioxide.

21. Plant according to claim 1, wherein the gas is nitrogen, oxygen or ozone.

22. Plant according to claim 1, wherein the liquid is an aqueous liquid.

23. Plant according to claim 1, wherein the gas is introduced into the liquid circuit in the gaseous state and the injection device comprises an injection apparatus slaved to a transfer pump so that the gas flow is interrupted if the pump stops, this apparatus feeding an outlet injector which emerges in the liquid circuit.

24. Plant according to claim 1, wherein the gas is introduced into the liquid circuit while in the liquid state, and the injection device comprises an expansion and control valve feeding an outlet injector which emerges in the liquid circuit.

25. Plant according to claim 1, wherein the mixing chamber is a device including a succession of tubes forming a coil.

26. Plant according to claim 1, wherein the mixing chamber is an in-line static mixer.

27. Plant according to claim 1, wherein the means for adjusting the pressure in the overhead of the tank further includes an expansion valve, the inlet of which is connected to the gas circuit and the outlet of which is connected to the overhead of the tank.

28. Plant according to claim 1, wherein the gas is carbon dioxide filtered and sterilized for food applications.

* * * * *